US011023507B2

(12) United States Patent
Shah et al.

(10) Patent No.: US 11,023,507 B2
(45) Date of Patent: Jun. 1, 2021

(54) METHODS AND SYSTEMS FOR PERFORMING A MODEL DRIVEN DOMAIN SPECIFIC SEARCH

(71) Applicant: Tata Consultancy Services Limited, Mumbai (IN)

(72) Inventors: Sapankumar Hiteshchandra Shah, Pune (IN); Vishnudas Raveendran, Pune (IN); Sreedhar Sannareddy Reddy, Pune (IN); Purushottham Gautham Basavarsu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 204 days.

(21) Appl. No.: 16/451,073

(22) Filed: Jun. 25, 2019

(65) Prior Publication Data

US 2019/0391992 A1 Dec. 26, 2019

(30) Foreign Application Priority Data

Jun. 26, 2018 (IN) .............................. 201821023737

(51) Int. Cl.
*G06F 16/00* (2019.01)
*G06F 16/33* (2019.01)
*G06F 16/93* (2019.01)
*G06F 16/901* (2019.01)

(52) U.S. Cl.
CPC ...... *G06F 16/3335* (2019.01); *G06F 16/3338* (2019.01); *G06F 16/9024* (2019.01); *G06F 16/93* (2019.01)

(58) Field of Classification Search
None
See application file for complete search history.

(56) References Cited

U.S. PATENT DOCUMENTS

| | | |
|---|---|---|
| 6,516,312 B1 | 2/2003 | Kraft et al. |
| 2004/0199491 A1 | 10/2004 | Bhatt |
| 2017/0132203 A1 | 5/2017 | Kim et al. |

*Primary Examiner* — Bai D Vu
(74) *Attorney, Agent, or Firm* — Finnegan, Henderson, Farabow, Garrett & Dunner LLP

(57) ABSTRACT

This disclosure relates to a model driven framework for realizing domain specific search system for unstructured text. The framework has two parts: information extraction system for defining various models such as a meta model, an instance model, an extraction model and mention model and a generic domain agnostic search system that works by interpreting the models specified via the information extraction system. The components of the search system are completely domain agnostic with no hard coded knowledge of the domain. The search system interprets the domain models specified in terms of the meta model to impart domain specificity to the search engine. In this sense, the framework is domain agnostic and it can be tailored for a new domain by just specifying domain related information in terms of the meta model. The model driven approach obviates need for re-coding the search system for any new domain of interest.

17 Claims, 12 Drawing Sheets

METHODS AND SYSTEMS FOR PERFORMING A MODEL DRIVEN DOMAIN SPECIFIC SEARCH

PRIORITY CLAIM

This U.S. patent application claims priority under 35 U.S.C. § 119 to Indian Patent Application No. 201821023737, filed on Jun. 26, 2018. The entire contents of the aforementioned application are incorporated herein by reference.

TECHNICAL FIELD

The disclosure herein generally relates to search systems, and, more particularly, to model driven systems and methods for performing domain specific searches.

BACKGROUND

In many application domains, keyword based search may not be enough. A search engine that understands application domain concepts and relations may be needed. The search engine also has to understand values of various quantities and their relations to domain entities. The latter is especially important in scientific and engineering domains. To build an effective search engine, text processing technologies such as Natural Language Processing (NLP), machine learning, etc., need to be clubbed with an understanding of nuances of domain entities and their relationships. Domain knowledge pertaining to generalization, specialization hierarchies, relation types, cardinalities, property value types, units, ranges, etc., play a key role in understanding text. To achieve right accuracy levels domain knowledge has to be codified into text processing algorithms. Implementing a domain specific search engine is therefore a highly effort and knowledge intensive activity, and needs to be repeated for each application domain of interest.

SUMMARY

Embodiments of the present disclosure present technological improvements as solutions to one or more of the above-mentioned technical problems recognized by the inventors in conventional systems.

In an aspect, there is provided a processor implemented method for performing a model driven domain specific search comprising: defining elements of at least one domain of interest using a meta model, an instance model, an extraction model and a mention model, wherein the meta model comprises a plurality of meta model classes and is configured to obtain entities pertaining to the at least one domain of interest, properties thereof and relations thereof, the instance model comprises a plurality of instance classes and is configured to either obtain or capture at least one instance of the entities, the properties thereof and the relations thereof, the extraction model comprises an extraction model class and is configured to specify at least one extraction method for one or more of the entities, the properties thereof and the relations thereof, and the mention model is configured to capture values and locations of extracted instances of entities mentions, instances of properties mentions and instances of relation mentions thereof using a plurality of mention classes; receiving a plurality of documents from a document repository; preprocessing raw text comprised in the plurality of documents to a text format, the preprocessing comprising one or more of sentence splitting, tokenization, stemming, part-of-speech (POS) tagging and parsing; obtaining at least one instance of the plurality of meta model classes, the plurality of instance classes and the extraction model class for the at least one domain of interest; extracting the instances of the entities mentions, instances of the properties mentions and instances of the relation mentions thereof from the preprocessed raw text using the obtained instance of the extraction model class and associating the instances of the entities mentions, instances of the properties mentions and instances of the relation mentions with corresponding instances of the meta model class; storing the extracted instances of the entities mentions, instances of the properties mentions and instances of the relation mentions in the mention model in an object graph form; indexing the object graph to a graph knowledge base along with the preprocessed raw text associated with each of the plurality of documents; generating a query language parser corresponding to the at least one domain of interest; translating, using the generated query language parser, a received search query to an equivalent query over the indexed graph knowledge base, wherein the search query is either an object query over the mentions or a keyword based text query or a combination thereof, wherein the equivalent query pertains to the at least one domain of interest; and identifying one or more matches related to the translated query in the graph knowledge base.

In another aspect, there is provided a system comprising: one or more data storage devices operatively coupled to the one or more processors and configured to store instructions configured for execution by the one or more processors to: define elements of at least one domain of interest using a meta model, an instance model, an extraction model and a mention model, wherein the meta model comprises a plurality of meta model classes and is configured to obtain entities pertaining to the at least one domain of interest, properties thereof and relations thereof, the instance model comprises a plurality of instance classes and is configured to either obtain or capture at least one instance of the entities, the properties thereof and the relations thereof, the extraction model comprises an extraction model class and is configured to specify at least one extraction method for one or more of the entities, the properties thereof and the relations thereof, and the mention model is configured to capture values and locations of extracted instances of entities mentions, instances of properties mentions and instances of relation mentions thereof using a plurality of mention classes; receive a plurality of documents from a document repository; preprocess raw text comprised in the plurality of documents to a text format, the preprocessing comprising one or more of sentence splitting, tokenization, stemming, part-of-speech (POS) tagging and parsing; obtain at least one instance of the plurality of meta model classes, the plurality of instance classes and the extraction model class for the at least one domain of interest; extract the instances of the entities mentions, instances of the properties mentions and instances of the relation mentions thereof from the preprocessed raw text using the obtained instance of the extraction model class and associating the instances of the entities mentions, instances of the properties mentions and instances of the relation mentions with corresponding instances of the meta model class; store the extracted instances of the entities mentions, instances of the properties mentions and instances of the relation mentions in the mention model in an object graph form; index the object graph to a graph knowledge base along with the preprocessed raw text associated with each of the plurality of documents; generate a query language parser corresponding to the at least one domain of interest; translate, using the generated query language parser, a received search query to an equivalent query over the indexed graph knowledge base, wherein the search query is either an object query over the mentions or a keyword based text query or a combination thereof, wherein the equivalent query pertains to the at least one domain of interest; and identify one or more matches related to the translated query in the graph knowledge base.

In yet another aspect, there is provided a computer program product comprising a non-transitory computer readable medium having a computer readable program embodied therein, wherein the computer readable program, when executed on a computing device, causes the computing device to: define elements of at least one domain of interest using a meta model, an instance model, an extraction model and a mention model, wherein the meta model comprises a plurality of meta model classes and is configured to obtain entities pertaining to the at least one domain of interest, properties thereof and relations thereof, the instance model comprises a plurality of instance classes and is configured to either obtain or capture at least one instance of the entities, the properties thereof and the relations thereof, the extraction model comprises an extraction model class and is configured to specify at least one extraction method for one or more of the entities, the properties thereof and the relations thereof, and the mention model is configured to capture values and locations of extracted instances of entities mentions, instances of properties mentions and instances of relation mentions thereof using a plurality of mention classes; receive a plurality of documents from a document repository; preprocess raw text comprised in the plurality of documents to a text format, the preprocessing comprising one or more of sentence splitting, tokenization, stemming, part-of-speech (POS) tagging and parsing; obtain at least one instance of the plurality of meta model classes, the plurality of instance classes and the extraction model class for the at least one domain of interest; extract the instances of the entities mentions, instances of the properties mentions and instances of the relation mentions thereof from the preprocessed raw text using the obtained instance of the extraction model class and associating the instances of the entities mentions, instances of the properties mentions and instances of the relation mentions with corresponding instances of the meta model class; store the extracted instances of the entities mentions, instances of the properties mentions and instances of the relation mentions in the mention model in an object graph form; index the object graph to a graph knowledge base along with the preprocessed raw text associated with each of the plurality of documents; generate a query language parser corresponding to the at least one domain of interest; translate, using the generated query language parser, a received search query to an equivalent query over the indexed graph knowledge base, wherein the search query is either an object query over the mentions or a keyword based text query or a combination thereof, wherein the equivalent query pertains to the at least one domain of interest; and identify one or more matches related to the translated query in the graph knowledge base.

In an embodiment of the present disclosure, the plurality of meta model classes include an OntMetaClass class configured to capture the entities, an OntMetaProperty class configured to capture the properties and an OntMetaRelation class configured to capture the relations, wherein an instance of the OntMetaProperty class is associated with an instance of the OntMetaClass and wherein the plurality of meta model classes are associated with an ExtractionModel class comprised in the extraction model.

In an embodiment of the present disclosure, the plurality of instance classes include an OntClassInstance class configured to capture the at least one instance of the entities, an OntPropertyInstance class configured to capture the properties of the at least one instance of the entities and an OntRelationInstance class configured to capture the relations between the at least one instance of the entities, wherein each of the instance classes is associated with a corresponding meta model class from the plurality of meta model classes.

In an embodiment of the present disclosure, the plurality of instance classes further includes one or more of a Synonym class configured to capture and associate a synonym with an instance of the plurality of instance classes using a synonym association; and a Unit class configured to capture permissible units for values associated with the instances of the OntPropertyInstance class.

In an embodiment of the present disclosure, the at least one extraction method is comprised in either a DictionaryExtractionModel, a PatternExtractionModel or a MLExtractionModel, wherein the DictionaryExtractionModel uses a dictionary of the instances of the entities, instances of the properties thereof and instances of the relations thereof to capture mentions of the instances of the entities, instances of the properties and instances of the relations in the preprocessed raw text, the PatternExtractionModel is associated with a set of patterns including (a) TextPattern to specify textual patterns that match against characters in the preprocessed raw text and (b) NLPPattern to specify patterns other than the characters and is based on natural language processing attributes including part of speech (POS) tags, dependency relations and lemmatization.

In an embodiment of the present disclosure, the at least one extraction method depends on one or more disambiguation rules generated based on the obtained or captured at least one instance of the entities, the properties thereof and the relations thereof.

In an embodiment of the present disclosure, the at least one extraction method is inherited along a generalized hierarchy of the entities, the properties thereof and the relations thereof.

In an embodiment of the present disclosure, the plurality of mention classes includes an OntClassMention, OntPropertyMention and an OntRelMention configured to associate the locations of extracted instances of entities mentions, instances of properties mentions and instances of relation mentions respectively.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
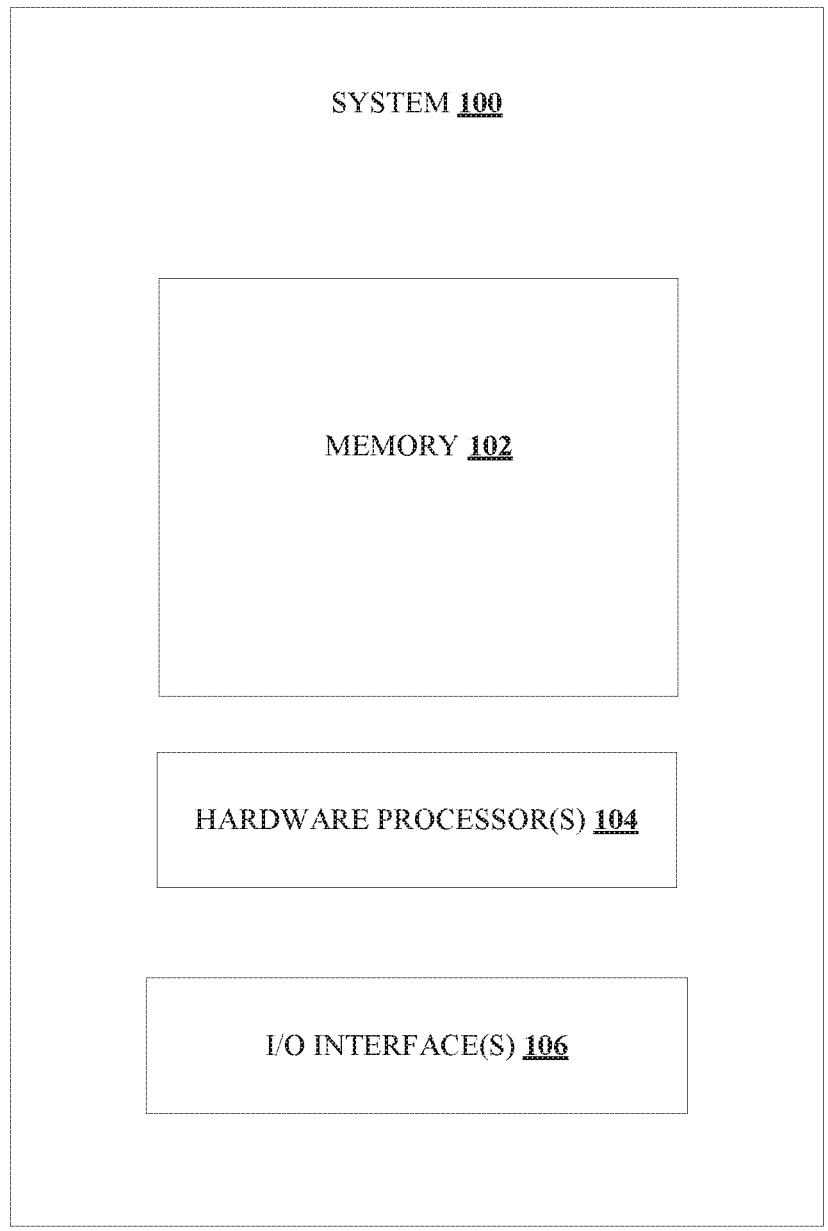
FIG. 1 illustrates an exemplary block diagram of a system for performing a model driven domain specific search, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A domain specific search engine typically involves text preprocessing, parsing, dependency analysis, information extraction, index building, and the like. Several technology stacks such as Stanford Core NLP exist for text preprocessing, parsing and dependency analysis. However, such methods are not available for entity and relation extraction, except for common entities such as person, organization, etc. Some information extraction tools enable plugging in of domain specific algorithms, but these tools do not provide a means to exploit domain knowledge such as generalization of entities and relations, cardinality constraints, property value constraints, and the like which are critical for performing search particularly in scientific and engineering domains. For instance, if say, a percentage composition of carbon in steel material is understood as part of domain knowledge, a search engine that utilizes the domain knowledge can rely on the percentage of carbon stated to infer whether the material may be associated with steel. Again, domain specific search approaches inspired by semantic web technologies necessitate that the content has to be first annotated with a domain ontology, which may not be practical in all scenarios.

Referring now to the drawings, and more particularly to FIG. 1 through FIG. 9B where similar reference characters denote corresponding features consistently throughout the figures, there are shown preferred embodiments and these embodiments are described in the context of the following exemplary system and/or method.

FIG. 1 illustrates an exemplary block diagram of a system 100 for for a model driven domain specific search in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
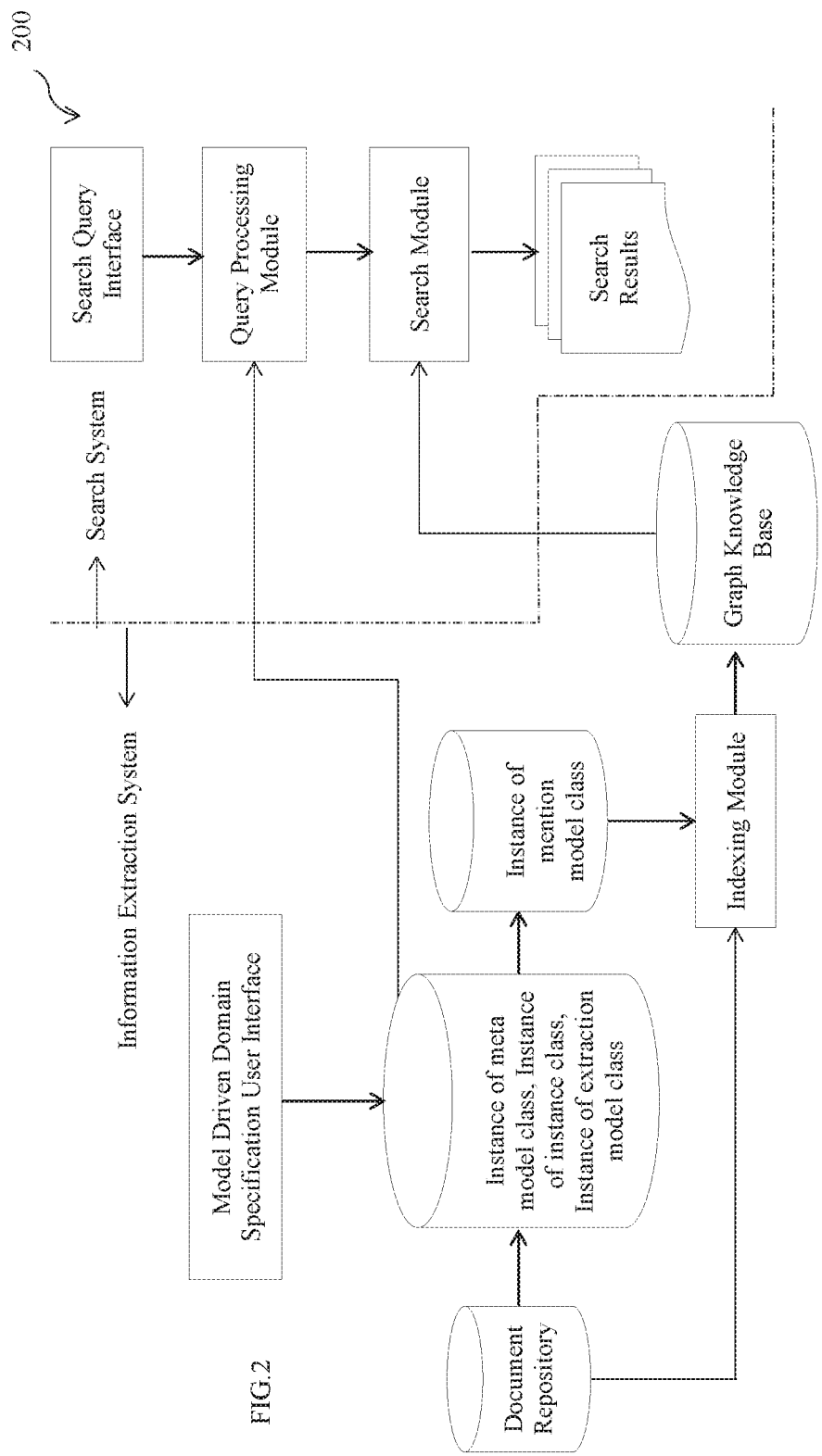
FIG. 2 illustrates architecture of an exemplary implementation of the system for performing a model driven domain specific search, in accordance with an embodiment of the present disclosure.

FIG. 2 illustrates architecture 200 of an exemplary implementation of the system 100 for a model driven domain specific search, in accordance with an embodiment of the present disclosure.

Figure 3A:
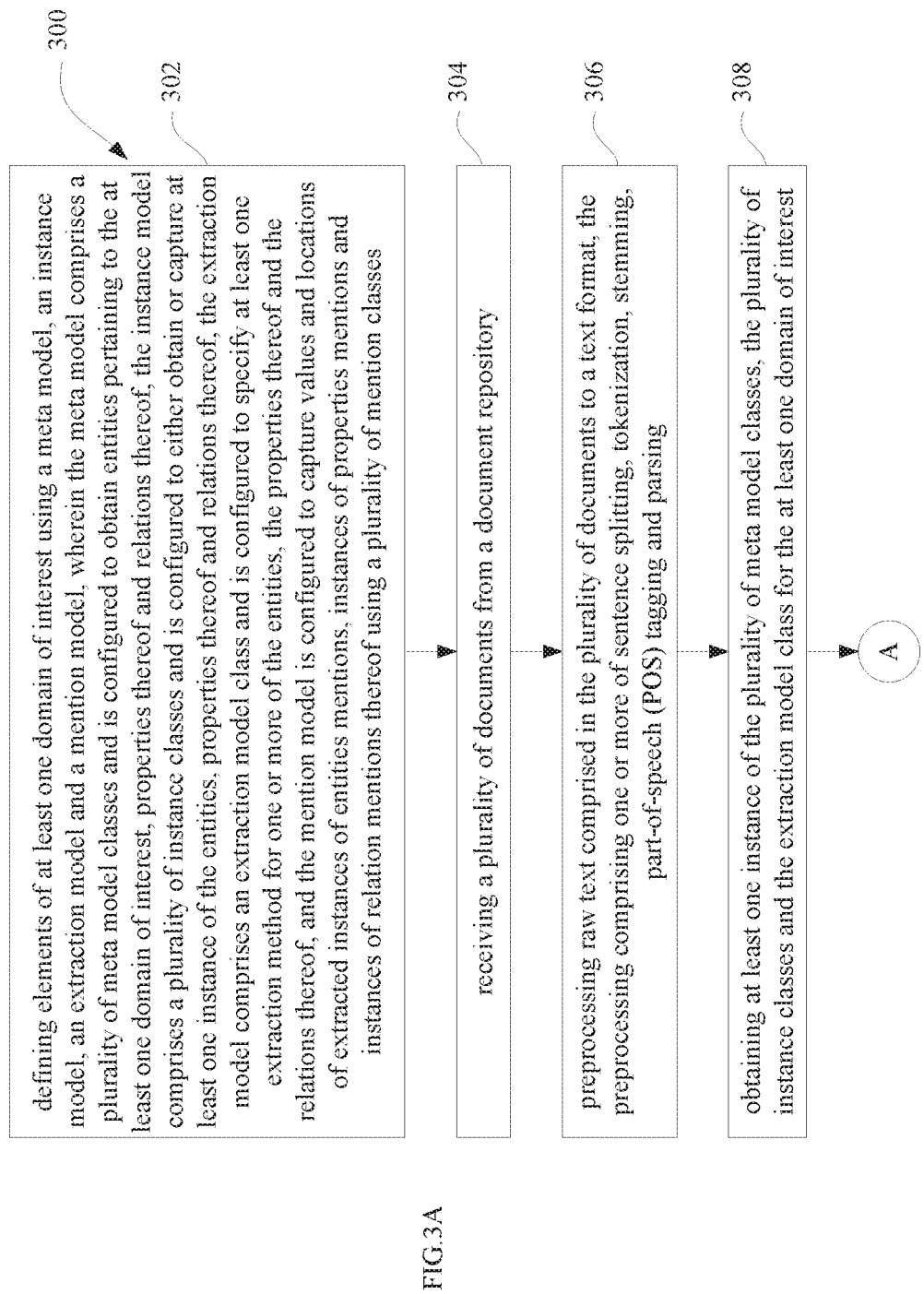
FIGS. 3A and 3B illustrate exemplary flow charts for a computer implemented method for performing a model driven domain specific search, in accordance with an embodiment of the present disclosure.
Figure 3B:
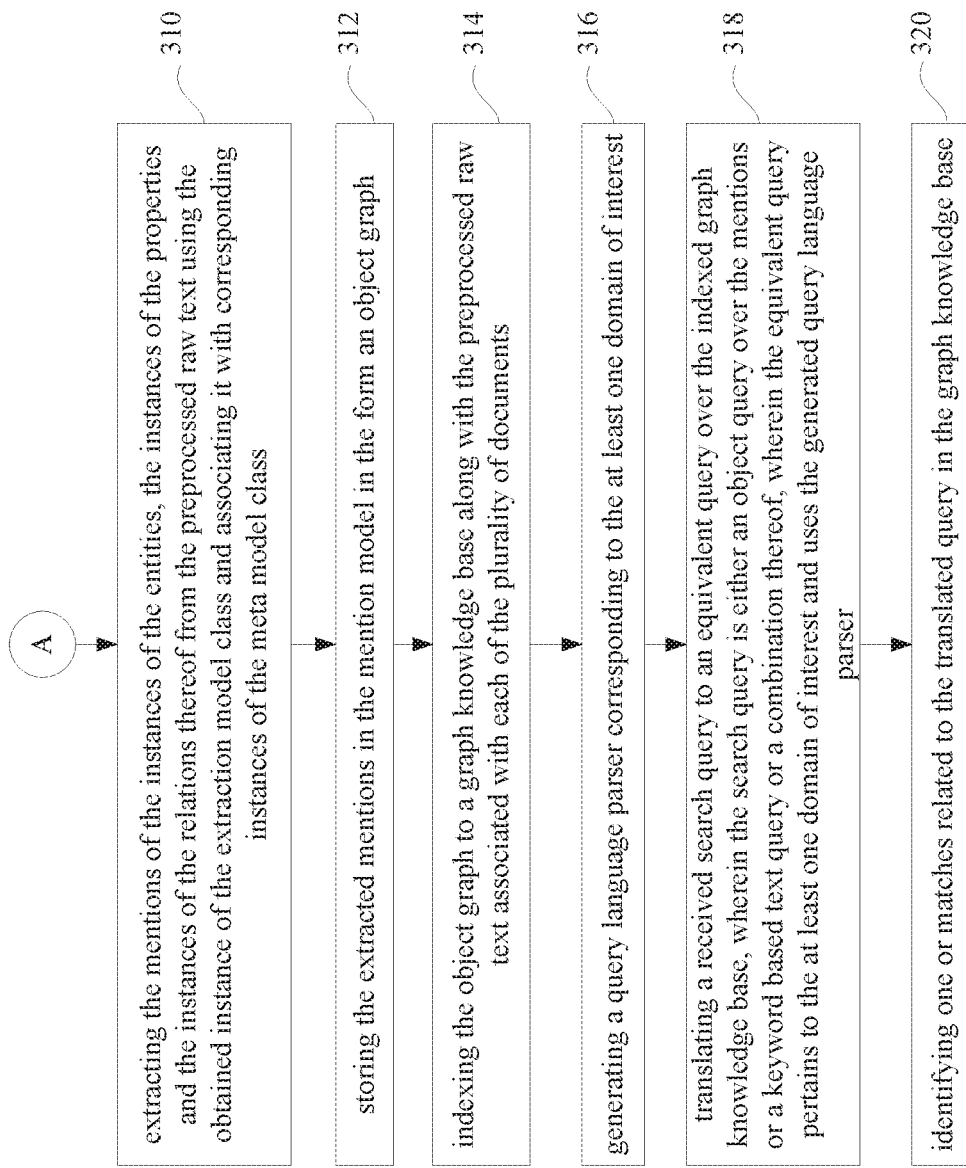

FIGS. 3A and 3B illustrate exemplary flow charts for a computer implemented method 300 for a model driven domain specific search, in accordance with an embodiment of the present disclosure. In an embodiment, the system 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system 100 of FIG. 1 and the exemplary architecture of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment, the architecture 200 mainly depicts a model driven framework for realizing domain specific search particularly for unstructured textual data. On a high level, the framework includes two parts: an information extraction system for defining various models (such as a meta model, an instance model, an extraction model and mention model) and a generic domain agnostic search system that works by interpreting the models specified via the information extraction system. In an embodiment, a domain expert facilitates defining specifications for a new domain that is further encoded in the meta model. Once the models are defined via the information extraction system, text mining may be initiated wherein the text mining involves information extraction and search. The information extraction comprises extracting instances of entities, properties and relations from a document repository using the extraction model. The document repository may contain structured and unstructured text sources such as internal company reports, online articles, publications, and the like. In an embodiment, the system 100 may be configured to create the document repository using a web crawler and automatically downloading domain specific documents. In accordance with the present disclosure, the extraction model takes each document from the document repository and performs entity, property and relation extraction. The extracted information is then stored in an object graph in the mention model which is further indexed by an indexing module to form a graph knowledge base and used for processing search queries by a search module. To specify search queries, a search query interface maybe provided. A query processing module ensures user queries are converted to an equivalent query in a format suitable for the domain of interest. It may be noted that domain specifications are explicitly captured and supplied as inputs for information extraction and searching. The extraction model and the search module are domain agnostic with no hard coded knowledge of the domain; it simply interprets the defined models to impart domain specificity to the search system. The search module then processes the knowledge graph knowledge base to retrieve matching documents.

Accordingly, in an embodiment of the present disclosure, the one or more processors 104 are configured to define elements of at least one domain of interest using a meta model, an instance model, an extraction model and a mention model, at step 302. The step of defining the elements of at least one domain of interest may be facilitated by a domain expert via a model driven domain specification user interface (UI) for the meta model, the instance model and the extraction model. The extraction model is used to generate the mention model.

Figure 4:
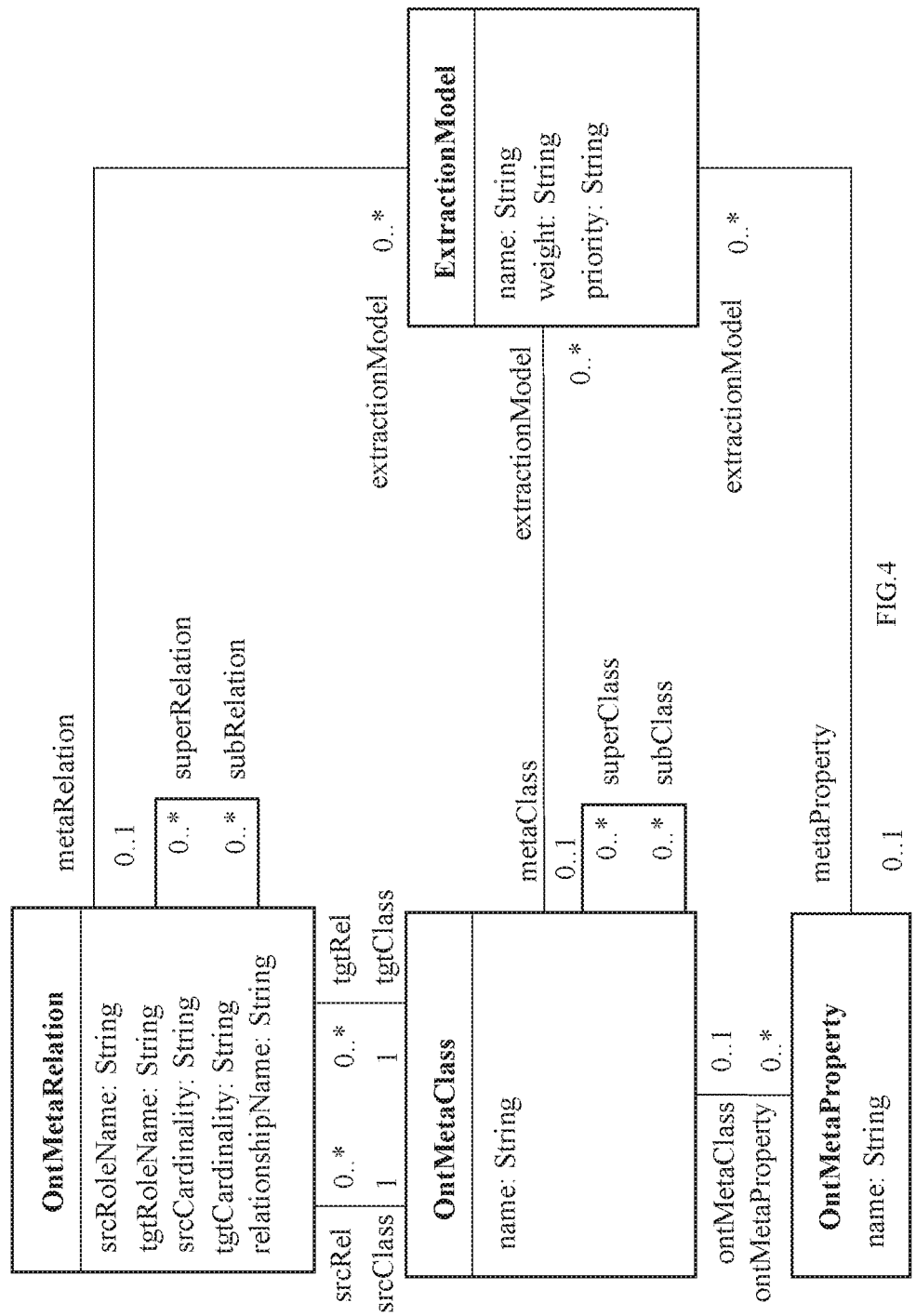
FIG. 4 illustrates an exemplary meta model in accordance with an embodiment of the present disclosure.

In an embodiment, the meta model comprises a plurality of meta model classes and is configured to obtain entities or concepts pertaining to the at least one domain of interest, properties associated with the entities and relations between the entities and their properties. Furthermore, the meta model obtains domain knowledge in the form of generalization or specialization hierarchies, relation cardinalities, property value types, value ranges, units, and the like are obtained. FIG. 4 illustrates an exemplary meta model in accordance with an embodiment of the present disclosure. In an embodiment, the plurality of meta model classes include an OntMetaClass class configured to capture the entities, an OntMetaProperty class configured to capture the properties and an OntMetaRelation class configured to capture the relations, wherein an instance of the OntMetaProperty class is associated with an instance of the OntMetaClass. Some examples are meta model classes for materials engineering domain are as follows:

OntMetaClass: Entities like Process, Material etc. may be created as instances of OntMetaClass class.

OntMetaProperty: Process has Process Parameter as its property. This fact may be represented as follows: an instance of OntMetaProperty class viz. ProcessParameter is first created. Process (an instance of OntMetaClass) is then associated with ProcessParameter using OntMetaProperty association.

Figure 5:
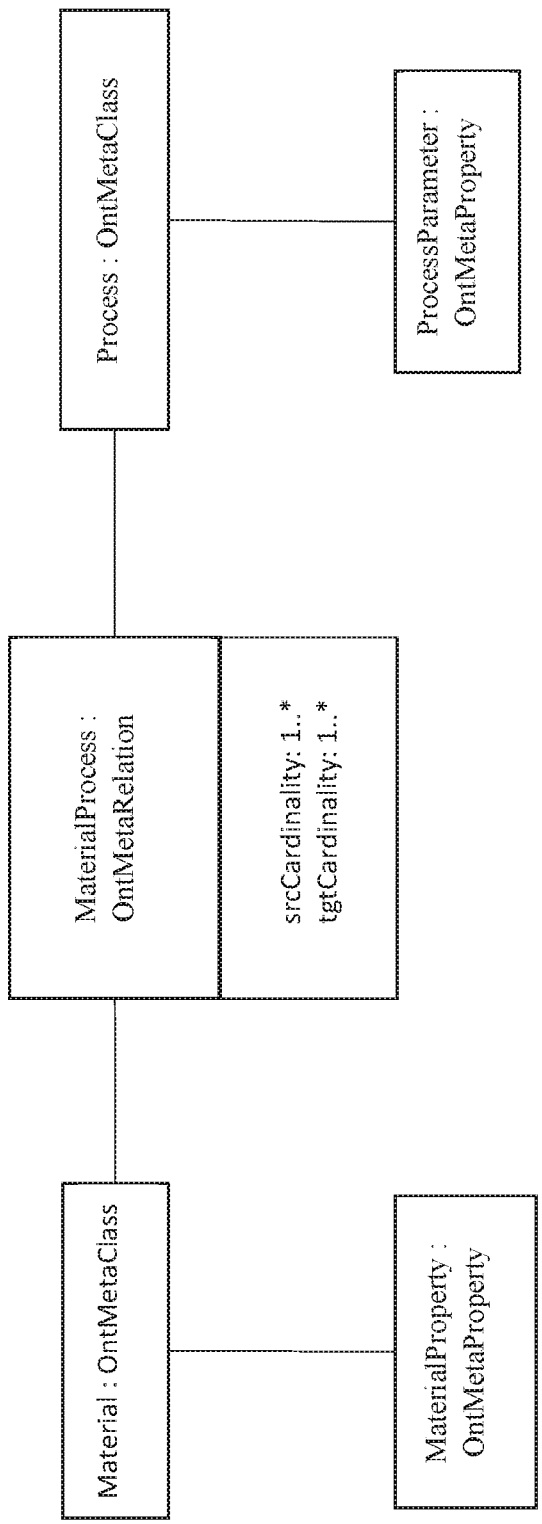
FIG. 5 illustrates an exemplary meta model for materials engineering domain in accordance with an embodiment of the present disclosure.

OntMetaRelation: A manufacturing process is applied to a material. This may be captured by creating an instance of OntMetaRelation class viz. process_material. In addition to this, two instances of OntMetaClass class are created viz. Process and Material. These two instances are then associated with an instance of OntMetaRelation viz. process_material using srcRel and tgtRel associations as depicted in FIG. 4. The three classes OntMetaClass class, OntMetaProperty class and OntMetaRelation class completely capture elements of the materials engineering domain. FIG. 5 illustrates an exemplary meta model for materials engineering domain in accordance with an embodiment of the present disclosure. In an embodiment, the metal model also provides a way to extract information. Towards this purpose, the plurality of meta model classes is associated with an ExtractionModel class comprised in the extraction model. As shown in FIG. 5, the entities Material and Process are created as instances of OntMetaClass class; the relation process_material is created as an instance of OntMetaRelation class; and MaterialProperty and ProcessParameter are created as instances of OntMetaProperty class and associated with the entities Material and Process respectively. FIG. 5 shows an entity with the notation "<entity-name>:<meta-entity-name>" notation. FIG. 5 also shows the cardinality of the relation process_material as 1 . . . *:1 . . . *, signifying that one material may be related with one or more processes, and vice versa. As seen in FIG. 4, generalization and specialization hierarchies among entities and relations may be defined using 'superClass/subClass' and 'superRelation/subRelation' associations respectively. For example, in a manufacturing domain, there may be entities such as 'Part', 'MechanicalPart' and 'ElectricalPart', the latter two being specializations of the former. Similarly, there may be a relation called 'Interaction' between parts; this relation may have specializations such as 'energy_exchange', 'matter_exchange', etc.

Figure 6A:
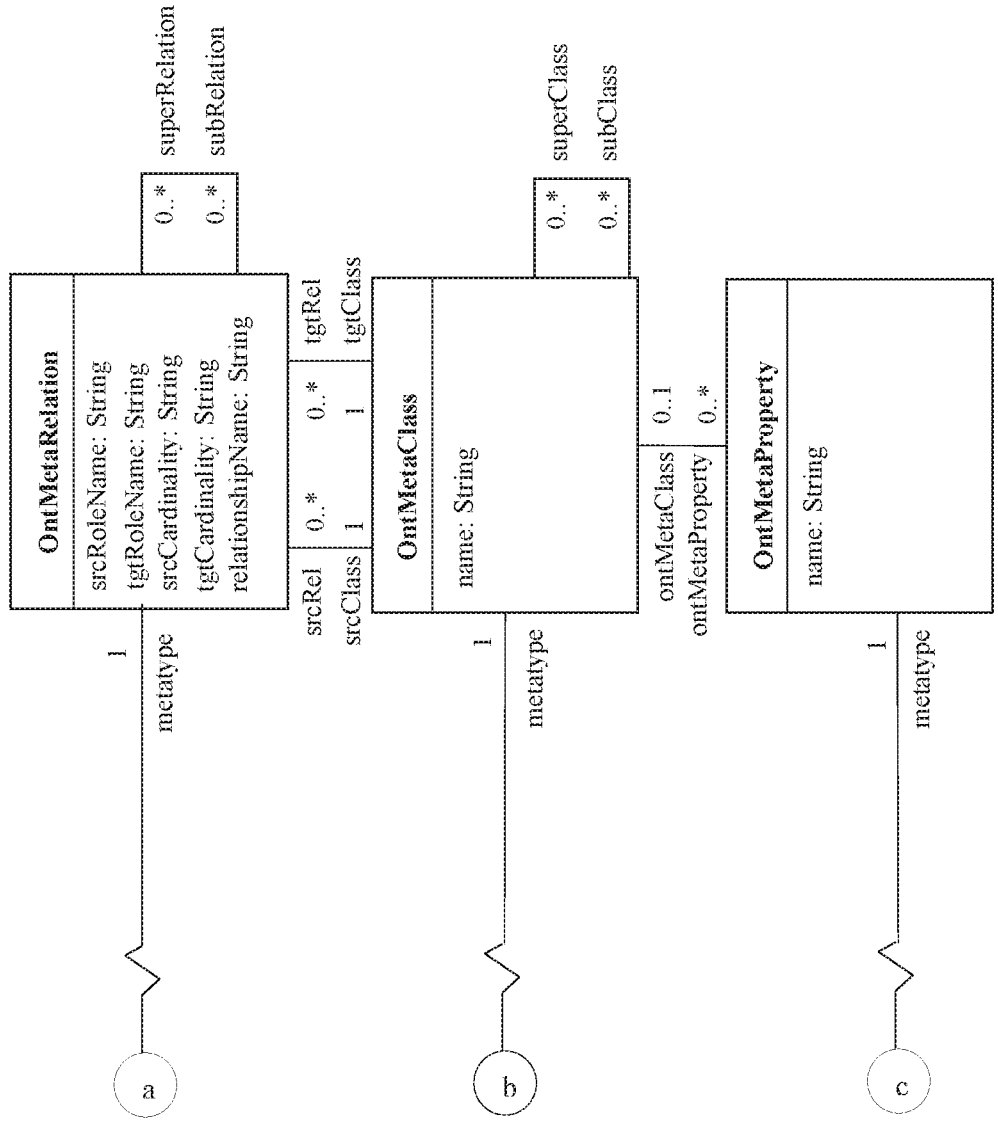
FIGS. 6A and 6B illustrates an exemplary instance model in accordance with an embodiment of the present disclosure.
Figure 6B:
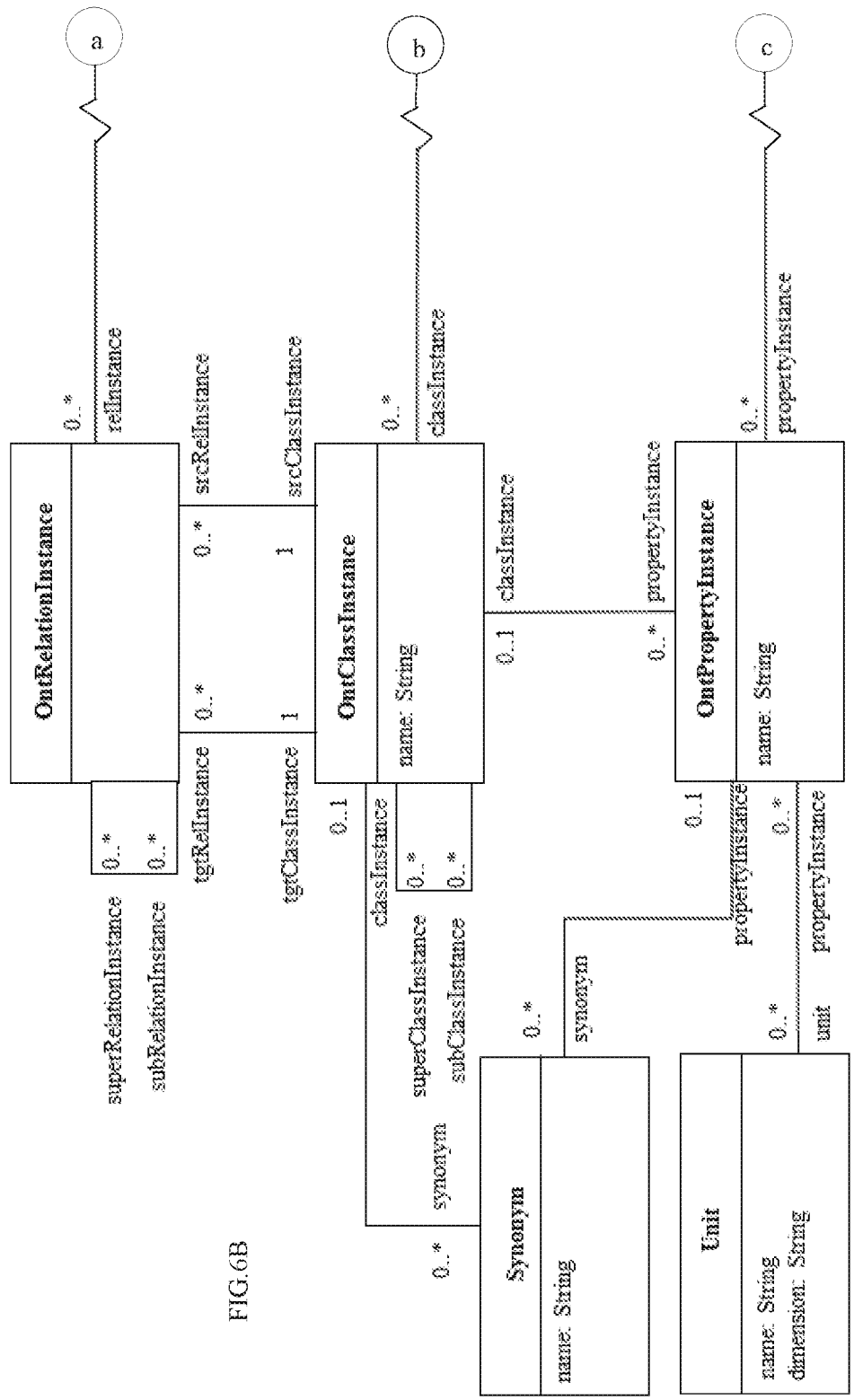
Figure 7:
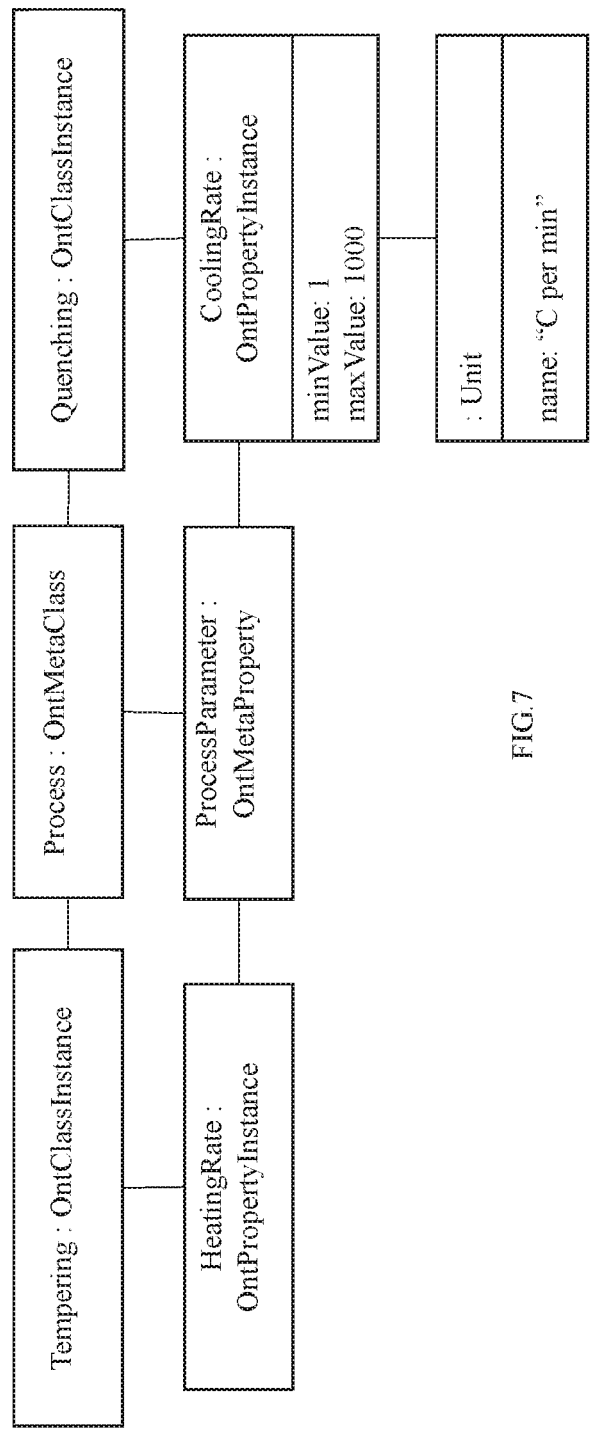
FIG. 7 illustrates an exemplary instance model for materials engineering domain in accordance with an embodiment of the present disclosure.

In an embodiment, the instance model comprises a plurality of instance classes and is configured to either obtain or capture at least one instance of the entities, their properties and relations associated between the entities and their properties. The at least one instance may be obtained from a domain expert or captured by machine learning. FIGS. 6A and 6B illustrates an exemplary instance model in accordance with an embodiment of the present disclosure. Using the instance model of FIGS. 6A and 6B, FIG. 7 illustrates an exemplary instance model for materials engineering domain in accordance with an embodiment of the present disclosure wherein two process instances and their parameters are shown, how they are created as instances of OntClassInstance class and OntPropertyInstance class and associated with corresponding domain entities and properties. In an embodiment, value ranges that the properties can take, units that can be used, etc. may also be captured. For instance, CoolingRate may be specified to have unit 'C per min' and a value range of 1 to 1000. Particularly, the instance model of FIG. 7 captures the fact that quenching, tempering, etc. are manufacturing processes; tensile strength, hardness, etc. are material properties and so on. In an embodiment, the plurality of instance classes may include an OntClassInstance class configured to capture the at least one instance of the entities, an OntPropertyInstance class configured to capture the properties of the at least one instance of the entities and an OntRelationInstance class configured to capture the relations between the at least one instance of the entities. In accordance with the present disclosure, each of the instance classes is associated with a corresponding meta model class from the plurality of meta model classes. For example, quenching is an instance of OntClassInstance class. The fact that it is a manufacturing process is captured by associating it with Process which is an instance of OntMetaClass class, meta model class.

In accordance with the present disclosure, synonyms and lexical variations of domain entities and their properties are also considered. In an embodiment, the plurality of instance classes may further include a Synonym class configured to capture and associate a synonym with an instance of the plurality of instance classes using a synonym association. For instance, yield strength and yield stress are synonyms and refer to the same domain entity. In accordance with the present disclosure, this may be captured as follows: an instance of OntMetaProperty class is created for yield strength; an instance of Synonym class is created for yield stress; yield strength is then associated with yield stress using the synonym association.

The instances of the OntPropertyInstance class generally have values when they appear in textual sources. In an embodiment, the plurality of instance classes may further include a Unit class configured to capture permissible units for values associated with the instances of the OntPropertyInstance class. The units for values may be used by the extraction model to associate values with the right property instances. For example, a value mentioned in a textual source may be associated with yield strength only when the value has pascal as its unit.

Figure 8:
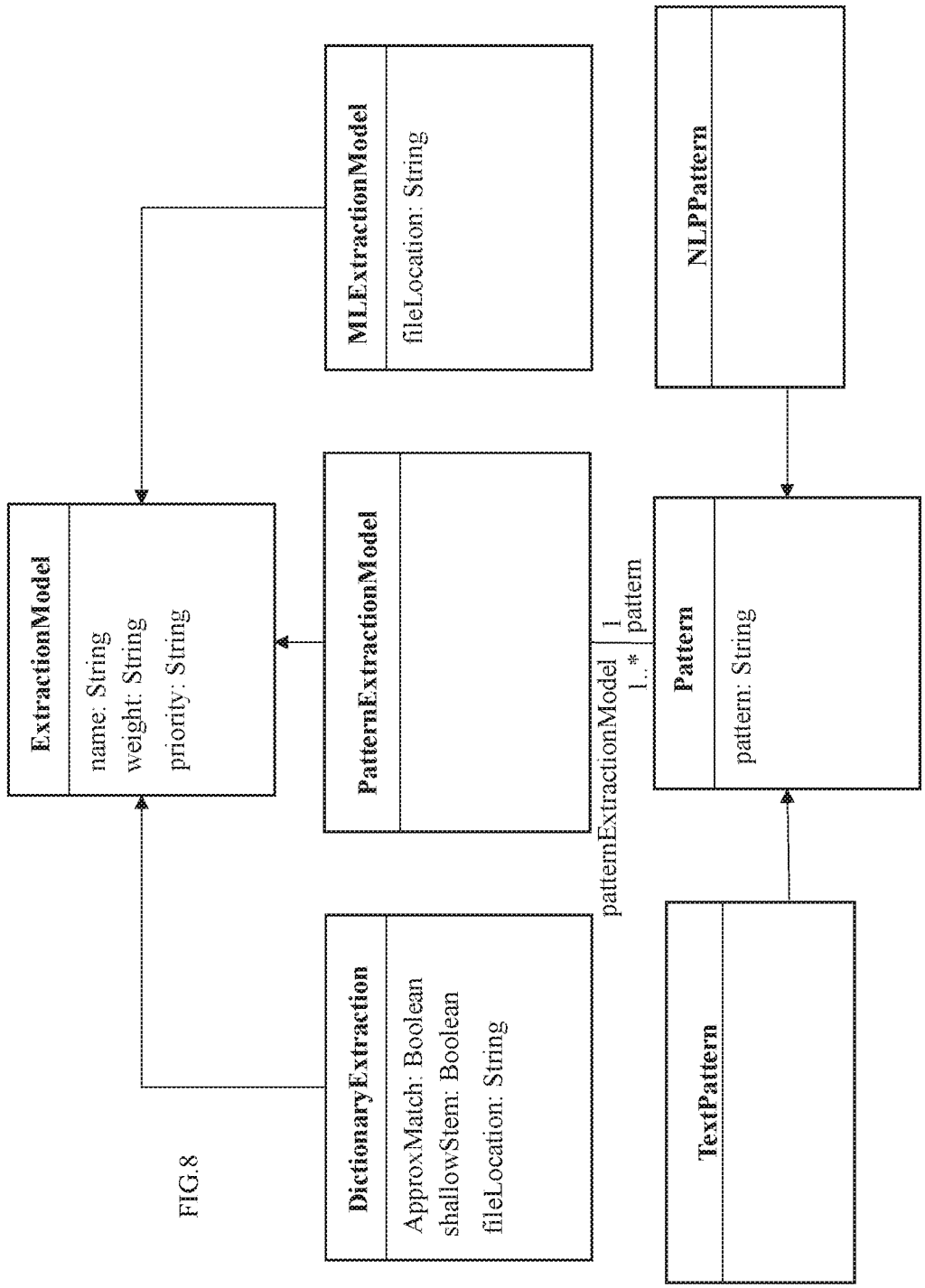
FIG. 8 illustrates an exemplary extraction model in accordance with an embodiment of the present disclosure.

In an embodiment, the extraction model comprises an extraction model class and is configured to specify at least one extraction method for one or more of the entities, the properties and the relations associated with the entities. FIG. 8 illustrates an exemplary extraction model in accordance with an embodiment of the present disclosure. In an embodiment, the at least one extraction method is comprised in a DictionaryExtractionModel, a PatternExtractionModel or a MLExtractionModel. In an embodiment the DictionaryExtractionModel uses a dictionary of the instances of the entities, instances of the associated properties and instances of the associated relations to capture mentions of the instances of the entities, instances of the properties and instances of the relations in preprocessed raw text comprised in a plurality of documents under consideration from a document repository. In an embodiment, the PatternExtractionModel is associated with a set of patterns including (a) TextPattern to specify textual patterns that match against characters in the preprocessed raw text and (b) NLPPattern to specify patterns other than the characters and is based on natural language processing attributes including part of speech (POS) tags, dependency relations and lemmatization. Different kinds of extraction models can be specified. For instance, the entity Material may have the PatternExtractionModel, Material Property may have the DictionaryExtractionModel and the relation process_material may have a machine learning based model such as the MLExtractionModel.

In an embodiment, a graphical user interface (GUI) may be provided for the domain expert to define instances of the meta model classes and the instance classes, relationships, the extraction model, etc. For instance, considering the materials engineering example considered earlier, Process has ProcessParameter as its property. This requires creating two instances: Process as an instance of OntMetaClass class and ProcessParameter as an instance of OntMetaProperty class. The two instances then need to be associated by the OntMetaProperty association. The system 100 of the present disclosure may provide GUI pages to create instances of OntMetaClass class, OntMetaProperty class and OntMetaRelation class. Once an instance is created, it may be associated with an instance of an appropriate OntMetaClass class. In an embodiment, the system 100 may provide a list of all instances of OntMetaClass class in a dropdown box for selection by the domain expert. The GUI may be designed such that the cardinality constraints of associations are respected when the domain expert enters domain related information.

Once the instances of meta model classes are created, the domain expert may create instances of the instance classes and the extraction class. For the ProcessParameter example described above, the domain expert may create various instances such cooling rate, soaking time, austenization temperature, annealing time, holding duration, etc. In an embodiment, the GUI may also facilitate relating the instances to their associated process names. Details on allowed units for each process parameter may also be captured. In an embodiment, the system 100 may also provide an import feature wherein such instances can be uploaded from an external file. The import feature is particularly helpful when instances of domain elements are directly available in external data sources.

In an embodiment of the present disclosure, the one or more processors 104 are configured to receive a plurality of documents from a document repository, at step 304. The document repository may contain structured and unstructured textual sources in different formats such as Portable Document Format (PDF), Word processing Document format (DOC), Hypertext Markup Language (HTML), and the like.

In an embodiment of the present disclosure, the one or more processors 104 are configured to preprocess, at step 306, the raw text comprised in the plurality of documents to a text format. In an embodiment, the preprocessing may comprise one or more of sentence splitting, tokenization, stemming, part-of-speech (POS) tagging and parsing.

In an embodiment of the present disclosure, the one or more processors 104 are configured to obtain, at step 308, at least one instance of the plurality of meta model classes, the instance classes and the extraction model class for the at least one domain of interest. Then for each entity of interest in the domain, an entity specific extraction method is used to extract mentions of the entity in the text; after that for each property of associated with the entity of interest, a property specific method is used to extract mentions of the property and for each relation of interest, a relation specific method is used to extract relation mentions.

Accordingly, in an embodiment of the present disclosure, the one or more processors 104 are configured to extract the instances of the entities mentions, instances of the properties mentions and instances of the relation mentions thereof, at step 310, from the preprocessed raw text using the obtained instance of extraction model class and associate the instances of the entities mentions, instances of the properties mentions and instances of the relation mentions with corresponding instances of the meta model class. The specific extraction method may be specified at a generic level and reused for multiple entities. Accordingly, an extraction method specified at a generic entity, property or relation level is inherited down the generalization hierarchy, until explicitly overridden at a specific entity, property or relation level. For instance, an extraction method specified for entity 'Person' may be used for extracting 'Employee', 'Manager', 'President', etc., unless explicitly overridden with a more specific extraction method. This facilitates scaling up information extraction for a large domain such as medical domain that contains thousands of entities and relations. In accordance with the present disclosure, there may not be a need to specify extraction methods for each of these entities and relations separately. Specifying the extraction method at a generic level and enabling reuse by inheriting the extraction method caters to this scenario.

Again, in NLP, available extraction algorithms may not be perfect. In accordance with an embodiment of the present disclosure, ambiguities, if any may be addressed by applying the obtained domain knowledge. For instance, let there be a sentence 'The specimen is heated to 1800 C and held for 5 mins prior to water quenching at 100 C per min to room temperature.' When this sentence is read by a domain expert, it is evident that 100 C per min refers to 'cooling rate' of a 'quenching' process. However, an extraction method may not be able to fathom this information as there is no explicit mention of 'cooling rate' in the sentence. In accordance with the present disclosure, the domain knowledge may be utilized to avert any ambiguity in such scenarios. In accordance with an embodiment of the present disclosure, the at least one extraction method depends on one or more disambiguation rules generated based on the obtained or captured at least one instance of the entities, properties thereof and relations thereof. In the given exemplary sentence, if the meta model obtains the entity 'quenching' with a property 'cooling rate' and the units of the property value are 'C per min', a disambiguation rule that may be generated is 'If v is a value unattached to any property and the sentence has an entity mention whose property unit matches v's unit, then attach v to that property.'. In an embodiment, the one or more disambiguation rules may be generated not only for units, but also for value types, value range constraints, and the like. Another example of a disambiguation rule may be understood for an exemplary sentence 'Tempering followed by quenching were performed at the rates of 120 C per min and 200 C per min respectively', wherein a domain expert may figure out that '120 C per min' refers to heating rate of tempering and '200 C per min' refers to cooling rate of quenching. However, an NLP may be confused since there is no mention of 'heating rate' and 'cooling rate'. In accordance with the present disclosure, the extraction model is configured to automatically figure this out based on the domain knowledge. Say the cardinality between 'quenching' and 'cooling rate' is 1:1, a disambiguation rule that may be generated is 'If an entity mention has two associated parameter values and the cardinality only permits one parameter value then attach only the nearest parameter value and look for the next nearest entity mention for the unattached value'.

In an embodiment, the disambiguation rules may be generated as represented by a pseudo code below, wherein the code traverses the elements of the domain of interest to find relevant patterns:

Value Centric Disambiguation Rules
For each instance p of OntPropertyInstance class:
  Generate the following rules:
  1. "If v is a value mention unattached to any property and the sentence has an entity mention e that has p as a property instance and p's unit matches v's unit, then attach v to property p".
  2. "If v is a value mention unattached to any property and the sentence has an entity mention e that has p as a property instance and p's value range matches Vs value, then attach v to property p".

Relation Centric Disambiguation Rules
For each instance r of OntRelationInstance class:
  If (r.tgtCardinality=1) then generate the following rule:
  "If an entity mention e has two associated parameter values both of which are instances of the target of r then attach only the nearest parameter value and look for the next nearest entity mention for the unattached value"

In an embodiment of the present disclosure, an extraction method may be represented as given below:
1. For each entity E of OntMetaClass class:
  Check if E has an extraction method;
  If not, check if one of its 'superClass' entities has an extraction method;
  If not, continue to the next entity;
  Use the extraction method to extract mentions of E from the text.
  1.1 for Each Property P of (E Union E.superClass*). ontMetaProperty. MetaProperty
    // E.superClass* refers to super class closure, i.e. all ancestors of E
    // i.e. obtaining the list of all own and inherited properties of E
    Check if P has an extraction method;
    If not, continue to the next property;
    Use the extraction method to extract mentions of P from the text.
2. For Each Relation R of OntMetaRelation Class:
  Check if R has an extraction method;
  If not, check if one of its 'superRelation' relations has an extraction method;
  If not, continue to a next relation;
  Use the extraction method to extract mentions of R from the text.
3. Apply the Generated Disambiguation Rules on Unresolved Mentions.

Figure 9A:
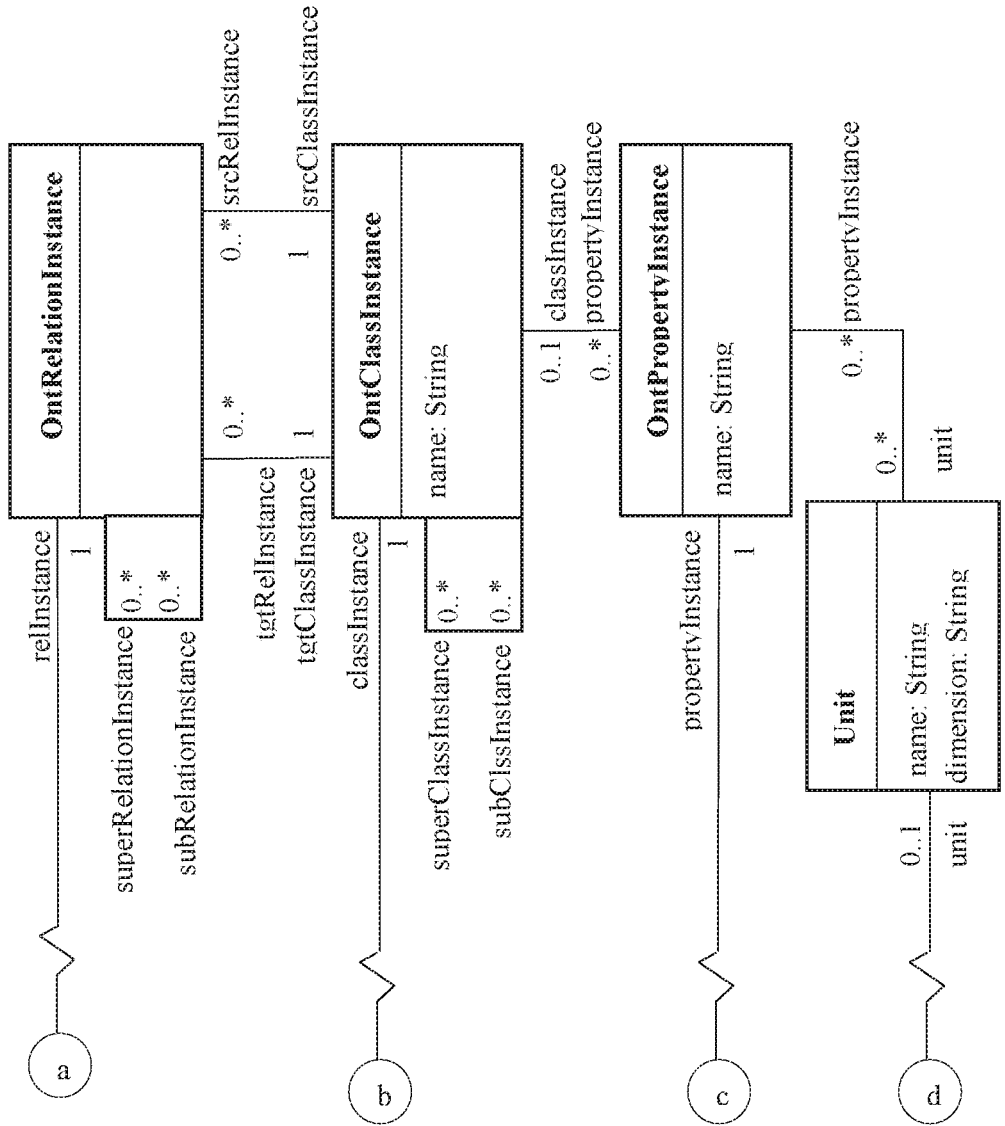
FIGS. 9A and 9B illustrate an exemplary mention model in accordance with an embodiment of the present disclosure.
Figure 9B:
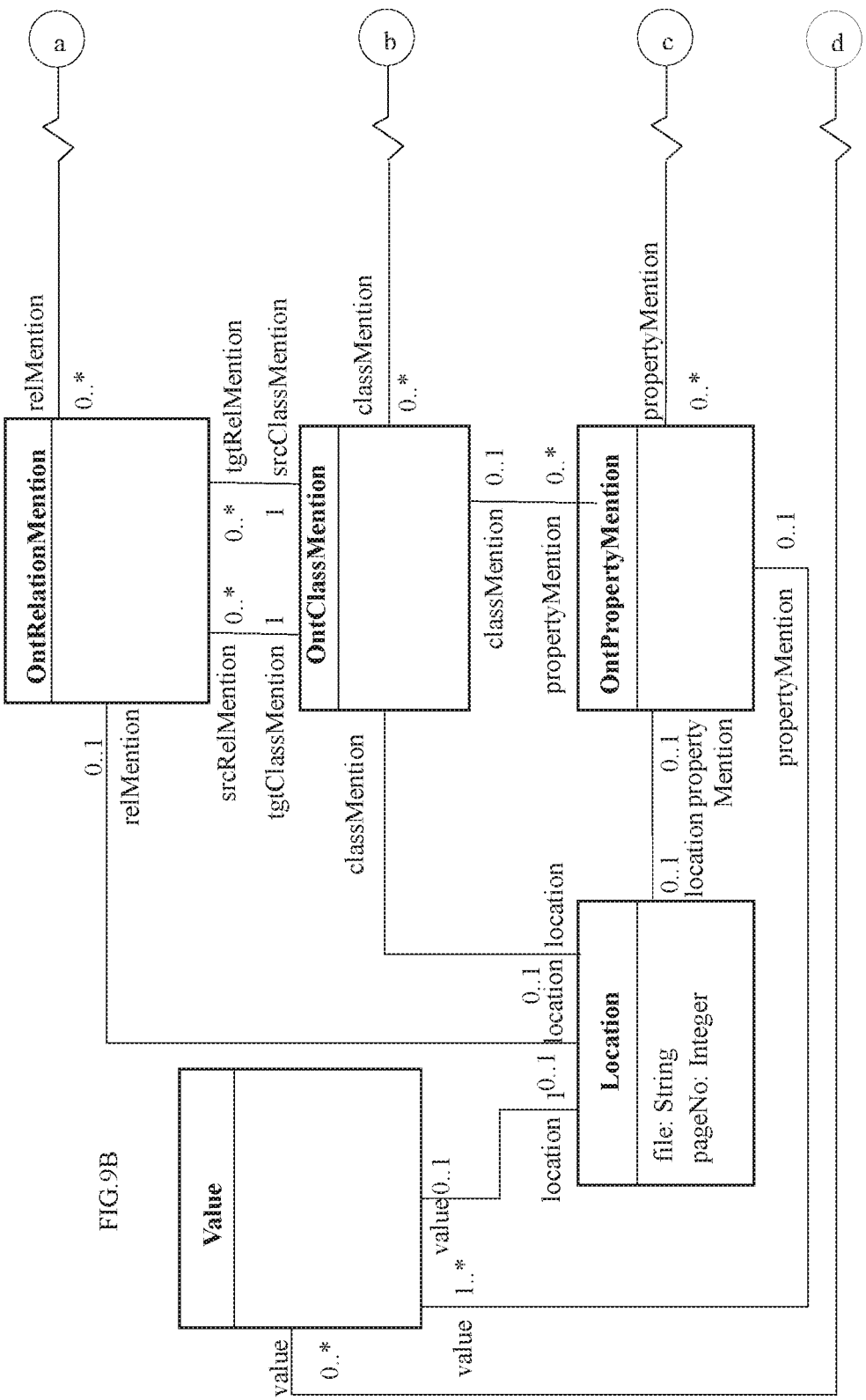

In an embodiment of the present disclosure, the one or more processors 104 are configured to store, at step 312, the extracted mentions in the mention model in an object graph form of the instances of the entities mentions, instances of the properties mentions and instances of the relation mentions. FIGS. 9A and 9B illustrates an exemplary mention model in accordance with an embodiment of the present disclosure. In an embodiment, the mention model is configured to capture values and locations of extracted instances of entities mentions, instances of properties mentions and instances of relation mentions thereof using a plurality of mention classes. For instance, a technical report on product failure may describe hardness values of material of a failed product on page number 3, paragraph number 2 in a document. In this case, it may be noted that hardness has a location with file name, page number and paragraph number information. Location may comprise of two classes: TableLocation class and TextLocation class. In case of TableLocation class, the information about table number, caption, row and column number may be captured by attributes of the TableLocation class. The TextLocation class may capture start and end position of the mention in addition to file name and page number. The TextLocation class may have suitable attributes to capture this information. For the example mentioned earlier, an instance of TextLocation class is created (with appropriate values for file name, page number, start and end position attributes). The values may be of five different types: TextValue (e.g. 'water' for quenching medium); NumericValue (e.g. 50 Rc for hardness); RangeValue (e.g. quenching time between 30-50 min); EnumValue (e.g. <critical/non-critical for failure rate>); and BooleanValue (e.g. <ON/OFF state of an equipment>). In an embodiment, in addition to Location and Value classes, the mention classes may further include an OntClassMention, an OntPropertyMention and an OntRelMention configured to associate the locations of extracted instances of entities mentions, instances of properties mentions and instances of relation mentions respectively. For an exemplary sentence 'The material was then quenched at the rate of 200 C/s.', for the mentions in this sentence, viz., quenched and rate, instances of OntClassMention and OntPropertyMention are created. Appropriate location instances are then created and associated with the two mentions. To capture information that quenched is a mention of quenching process instance and rate is a mention of cooling rate instance, the two mentions are associated with Quenching (an instance of OntClassInstance) and CoolingRate (an instance of OntPropertyInstance). The Quenching and CoolingRate are in turn associated with Process and ProcessParameter respectively. The algorithm for extracting values then extracts 200 as an instance of Value class and C/s as an instance of Unit class. The extraction model specified for the ProcessParameter then may associate the value instance with the rate mention. An example of such an extraction model may be: an instance of PatternExtractionModel with a pattern: "<property> of <value> <unit>" where property needs to match a process parameter instance; value needs to be an instance of Value class; unit needs to be an instance of Unit class and needs to be present in the allowed list of units for the matched process parameter instance. At the end of the step of extracting, for each document, instances of various classes in the mention model are created. The details about the elements associated with these mention instances are captured by the instances of instance model and meta model.

model and instance model for the domain under consideration. In an embodiment of the present disclosure, the one or more processors 104 are configured to translate a received search query to an equivalent query over the indexed graph knowledge base at step 318. The search query may either be an object query over the mentions or a keyword based text query or a combination thereof. In accordance with the present disclosure, the equivalent query pertains to the at least one domain of interest and uses the generated query language parser.

In an embodiment of the present disclosure, a search query interface may be provided for receiving input search queries. The search query interface may be a declarative query language interface or a GUI based interface. In an embodiment, the query processor module generates the query language parser, translates the query, applies it to the indexed graph knowledge base and presents the results. In an embodiment of the present disclosure, the one or more processors 104 are configured to identify one or more matches related to the translated query in the graph knowledge base at step 320.

A subset of the grammar used in the query language parser in accordance with an embodiment of the present disclosure may be represented as given below.

```
query:-                    relationalQuery ("TextQuery:" "{" keywordQuery "}" )?;
relationalQuery:-          modifiers relationalExpr (booleanOperator modifiers
                           relationalExpr)*
modifiers:-                "+" | "–" | "!"
booleanOperator:-          "&" | "|"
relationalExpr:-           relationalTerm | "(" relationalQuery ")"
relationalTerm:-           objectQueryExpression | propertyValueExpression
objectQueryExpression:-    $OntClassInstance ("." ( $tgtRelInstance |
                           $srcRelInstance) "." $OntClassInstance)*
propertyValueExpression:-  objectQueryExpression
                           "[" propertyExpression (relationalOperator value)?
                           (booleanOperator propertyExpression (relationalOperator
                           value)? )* "]" |
                           objectQueryExpression "." propertyExpression
                           (relationalOperator value)?
propertyExpression:-       $propertyInstance "." $OntPropertyInstance
relationalOperator:-       ">" | "<" | "≥" | "≤" | ":"
value:-                    NUMBER | ( "[" NUMBER "," NUMBER "]" )
keywordQuery:-             any keyword based search query terms
```

Thus, post the step of extracting mentions, an object graph of the classes in the mention model, instance model and meta model is generated. This graph is then stored in the graph knowledge base for further processing.

In an embodiment of the present disclosure, the one or more processors 104 are configured to index the object graph to a graph knowledge base along with the preprocessed raw text associated with each of the plurality of documents, at step 314. Indexing of the preprocessed raw text enables object based queries over mentions to be executed along with keyword based queries.

A search in each domain necessitates use of a specific structured query with a specific syntax or format relevant with to the domain under consideration. When the domain is changed for a new search, the query language would also need to be modified accordingly. In an embodiment of the present disclosure, the one or more processors 104 are configured to generate a query language parser corresponding to the at least one domain of interest, at step 316. The query language parser is domain agnostic and performs a check on whether the received query is compatible with the domain under consideration based on instances of the meta The basic unit of a query is a value constraint/condition on the domain instances and their properties (represented by relationalTerm in the grammar). The language provides Boolean operators to build complex queries over such constraints. A constraint may be specified either as a point value constraint or as a range value constraint. The range constraint may be specified either with lower and upper bounds (e.g. [1, 10]) or with relational operators such as >, <, ≥ or ≤. The query language parser provides a syntax similar to path expressions to traverse associations between the domain entities and their properties. The query language parser also provides a way to combine value constraint based queries with keyword based queries. It may be noted that all the non-terminals in the language that start with $ provide a means to either refer to various domain model entities or a way to traverse their properties and relations. In this way, the query language parser provides a generic template which may be specialized for a given domain by means of domain model specifications.

In an embodiment, the domain agnostic query language parser may be instantiated for a materials engineering domain by generating following rules:

```
propertyValueExpression:- objectQueryExpression
                         "["    propertyExpression (relationalOperator value)?
                         (booleanOperator propertyExpression (relationalOperator
                         value)? )*  "]" |
                         objectQueryExpression      "."   propertyExpression
                         (relationalOperator value)?
objectQueryExpression :- "Tempering"
objectQueryExpression :- "Quenching"
propertyExpression :-          "HeatingRate"
propertyExpression :-          "CoolingRate"
This generated fragment allows writing of queries of a form like
"tempering[HeatingRate > 100] & quenching[CoolingRate < 250]".
```

An example query for the materials engineering domain may be as shown below.

"material.carbon: [0.2, 0.3] weight % AND material.elongation >0.4":

This query searches for all documents where the material used has carbon composition in the range of 0.2 to 0.3 weight percentage and the elongation of the material during experiments was greater than 0.4.

Another example query may be as shown below.

"quenching [cooling rate>=200 C/s AND time>=30 min] AND steel. UTS:[400, 500] MPa":

This query searches for all documents where quenching process is performed with the cooling rate of 200 C/s or above and quenching time of 30 min or above. These documents must also mention steel material whose tensile strength is in the range of 400 to 500 MPa.

Thus in accordance with the present disclosure, effective domain specific search is enabled by using domain knowledge along with NLP technology. The model driven domain specific search ensures there is no need for re-coding of the search system for use with a new domain. The meta model captures the domain knowledge and in conjunction with the instance model, the extraction model and the mention model enable efficient relation-aware search in unstructured text. Furthermore, the search queries are automatically customized to be suitable for the domain of interest. Indexing the object graph leads to efficient and optimized storage and faster search retrieval.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for performing a model driven domain specific search comprising:
    defining elements of at least one domain of interest using a meta model, an instance model, an extraction model and a mention model, wherein the meta model comprises a plurality of meta model classes and is configured to obtain entities pertaining to the at least one domain of interest, properties associated with the entities and relations between the entities and between the properties associated with the entities, the instance model comprises a plurality of instance classes and is configured to either obtain or capture at least one instance of the entities, the properties associated with the at least one instance of the entities and the relations between the entities and between the properties associated with the at least one instance of the entities, the extraction model comprises an extraction model class and is configured to specify at least one extraction method for one or more of the entities, the properties associated with the one or more entities and the relations between the one or more entities and between the properties associated with the one or more entities, and the mention model is configured to capture values and locations of extracted instances of entities mentions, instances of properties mentions and instances of relation mentions associated with the entities mentions using a plurality of mention classes;
    receiving a plurality of documents from a document repository;
    preprocessing raw text comprised in the plurality of documents to a text format, the preprocessing comprising one or more of sentence splitting, tokenization, stemming, part-of-speech (POS) tagging and parsing;
    obtaining at least one instance of the plurality of meta model classes, the plurality of instance classes and the extraction model class for the at least one domain of interest;
    extracting the instances of the entities mentions, instances of the properties mentions and instances of the relation mentions between the associated entities mentions and between the properties mentions associated with the entities mentions from the preprocessed raw text using the obtained instance of the extraction model class and associating the instances of the entities mentions, instances of the properties mentions and instances of the relation mentions with corresponding instances of the meta model class;
    storing the extracted instances of the entities mentions, instances of the properties mentions and instances of the relation mentions in the mention model in an object graph form;
    indexing the object graph to a graph knowledge base along with the preprocessed raw text associated with each of the plurality of documents;
    generating a query language parser corresponding to the at least one domain of interest;
    translating, using the generated query language parser, a received search query to an equivalent query over the indexed graph knowledge base, wherein the search query is either (i) an object query over the mentions, (ii) a keyword based text query or (iii) a combination of the object query over the mentions and the keyword based text query, wherein the equivalent query pertains to the at least one domain of interest; and
    identifying one or more matches related to the translated query in the graph knowledge base.

2. The processor implemented method of claim 1, wherein the plurality of meta model classes include an OntMetaClass class configured to capture the entities, an OntMetaProperty class configured to capture the properties and an OntMetaRelation class configured to capture the relations, wherein an instance of the OntMetaProperty class is associated with an instance of the OntMetaClass and wherein the plurality of meta model classes are associated with an ExtractionModel class comprised in the extraction model.

3. The processor implemented method of claim 2, wherein the plurality of instance classes include an OntClassInstance class configured to capture the at least one instance of the entities, an OntPropertyInstance class configured to capture the properties of the at least one instance of the entities and an OntRelationInstance class configured to capture the relations between the at least one instance of the entities, wherein each of the instance classes is associated with a corresponding meta model class from the plurality of meta model classes.

4. The processor implemented method of claim 3, wherein the plurality of instance classes further includes one or more of a Synonym class configured to capture and associate a synonym with an instance of the plurality of instance classes using a synonym association; and a Unit class configured to capture permissible units for values associated with the instances of the OntPropertyInstance class.

5. The processor implemented method of claim 4, wherein the at least one extraction method is comprised in either a DictionaryExtractionModel, a PatternExtractionModel or a MLExtractionModel, wherein the DictionaryExtractionModel uses a dictionary of the instances of the entities, instances of the properties associated with the instances of the entities and instances of the relations between the instances of the entities and between the properties associated with the instances of the entities to capture mentions of the instances of the entities, the instances of the properties and the instances of the relations in the preprocessed raw text, the PatternExtractionModel is associated with a set of patterns including (a) TextPattern to specify textual patterns that match against characters in the preprocessed raw text and (b) NLPPattern to specify patterns other than the characters and is based on natural language processing attributes including part of speech (POS) tags, dependency relations and lemmatization.

6. The processor implemented method of claim 5, wherein the at least one extraction method depends on one or more disambiguation rules generated based on the obtained or captured at least one instance of the entities, the properties associated with the at least one instance of the entities and the relations between the at least one instance of the entities and between the properties associated with the at least one instance of the entities.

7. The processor implemented method of claim 1, wherein the at least one extraction method is inherited along a generalized hierarchy of the entities, the properties associated with the entities and the relations between the entities and between the properties associated with the entities.

8. The processor implemented method of claim 1, wherein the plurality of mention classes includes an OntClassMention, OntPropertyMention and an OntRelMention configured to associate the locations of the extracted instances of entities mentions, instances of properties mentions and instances of relation mentions respectively.

9. A system comprising:
one or more data storage devices operatively coupled to one or more hardware processors and configured to store instructions configured for execution by the one or more hardware processors to:
define elements of at least one domain of interest using a meta model, an instance model, an extraction model and a mention model, wherein the meta model comprises a plurality of meta model classes and is configured to obtain entities pertaining to the at least one domain of interest, properties associated with the entities and relations between the entities and between the properties associated with the entities, the instance model comprises a plurality of instance classes and is configured to either obtain or capture at least one instance of the entities, the properties associated with the at least one instance of the entities and the relations between the entities and between the properties associated with the at least one instance of the entities, the extraction model comprises an extraction model class and is configured to specify at least one extraction method for one or more of the entities, the properties associated with the one or more entities and the relations between the one or more entities and between the properties associated with the one or more entities, and the mention model is configured to capture values and locations of extracted instances of entities mentions, instances of properties mentions and instances of relation mentions associated with the entities mentions using a plurality of mention classes;
receive a plurality of documents from a document repository;
preprocess raw text comprised in the plurality of documents to a text format, the preprocessing comprising one or more of sentence splitting, tokenization, stemming, part-of-speech (POS) tagging and parsing;
obtain at least one instance of the plurality of meta model classes, the plurality of instance classes and the extraction model class for the at least one domain of interest;
extract instances of the entities mentions, instances of the properties mentions and instances of the relation mentions between the associated entities mentions and between the properties mentions associated with the entities mentions from the preprocessed raw text using the obtained instance of the extraction model class and associating the instances of the entities mentions, instances of the properties mentions and instances of the relation mentions with corresponding instances of the meta model class;
store the extracted instances of the entities mentions, instances of the properties mentions and instances of the relation mentions in the mention model in an object graph form;
index the object graph to a graph knowledge base along with the preprocessed raw text associated with each of the plurality of documents;
generate a query language parser corresponding to the at least one domain of interest;
translate, using the generated query language parser, a received search query to an equivalent query over the indexed graph knowledge base, wherein the search query is either (i) an object query over the mentions, (ii) a keyword based text query or (iii) a combination, of the object query over the mentions and the keyword based text query wherein the equivalent query pertains to the at least one domain of interest; and
identify one or more matches related to the translated query in the graph knowledge base.

10. The system of claim 9, wherein the plurality of meta model classes include an OntMetaClass class configured to capture the entities, an OntMetaProperty class configured to capture the properties and an OntMetaRelation class configured to capture the relations, wherein an instance of the OntMetaProperty class is associated with an instance of the OntMetaClass and wherein the plurality of meta model classes are associated with an ExtractionModel class comprised in the extraction model.

11. The system of claim 10, wherein the plurality of instance classes include an OntClassInstance class configured to capture the at least one instance of the entities, an OntPropertyInstance class configured to capture the properties of the at least one instance of the entities and an OntRelationInstance class configured to capture the relations between the at least one instance of the entities, wherein each of the instance classes is associated with a corresponding meta model class from the plurality of meta model classes.

12. The system of claim 11, wherein the plurality of instance classes further includes one or more of a Synonym class configured to capture and associate a synonym with an instance of the plurality of instance classes using a synonym association; and a Unit class configured to capture permissible units for values associated with the instances of the OntPropertyInstance class.

13. The system of claim 12, wherein the at least one extraction method is comprised in either a DictionaryExtractionModel, a PatternExtractionModel or a MLExtractionModel, wherein the DictionaryExtractionModel uses a dictionary of the instances of the entities, instances of the properties associated with the instances of the entities and instances of the relations between the instances of the entities and between the properties associated with the instances of the entities to capture mentions of the instances of the entities, the instances of the properties and the instances of the relations in the preprocessed raw text, the PatternExtractionModel is associated with a set of patterns including (a) TextPattern to specify textual patterns that match against characters in the preprocessed raw text and (b) NLPPattern to specify patterns other than the characters and is based on natural language processing attributes including part of speech (POS) tags, dependency relations and lemmatization.

14. The system of claim 13, wherein the at least one extraction method depends on one or more disambiguation rules generated based on the obtained or captured at least one instance of the entities, the properties associated with the at least one instance of the entities and the relations between the at least one instance of the entities and between the properties associated with the at least one instance of the entities.

15. The system of claim 9, wherein the at least one extraction method is inherited along a generalized hierarchy of the entities, the properties thereof associated with the entities and the relations between the entities and between the properties associated with the entities.

16. The system of claim 9, wherein the plurality of mention classes includes an OntClassMention, OntPropertyMention and an OntRelMention configured to associate the locations of extracted instances of entities mentions, instances of properties mentions and instances of relation mentions respectively.

17. A computer program product comprising a non-transitory computer readable medium having a computer readable program embodied therein, wherein the computer readable program, when executed on a computing device, causes the computing device to:

define elements of at least one domain of interest using a meta model, an instance model, an extraction model and a mention model, wherein the meta model comprises a plurality of meta model classes and is configured to obtain entities pertaining to the at least one domain of interest, properties associated with the entities and relations between the entities and between the properties associated with the entities, the instance model comprises a plurality of instance classes and is configured to either obtain or capture at least one instance of the entities, the properties associated with the at least one instance of the entities and the relations between the entities and between the properties associated with the at least one instance of the entities, the extraction model comprises an extraction model class and is configured to specify at least one extraction method for one or more of the entities, the properties associated with the one or more entities and the relations between the one or more entities and between the properties associated with the one or more entities, and the mention model is configured to capture values and locations of extracted instances of entities mentions, instances of properties mentions and instances of relation mentions associated with the entities mentions using a plurality of mention classes;

receive a plurality of documents from a document repository;

preprocess raw text comprised in the plurality of documents to a text format, the preprocessing comprising one or more of sentence splitting, tokenization, stemming, part-of-speech (POS) tagging and parsing;

obtain at least one instance of the plurality of meta model classes, the plurality of instance classes and the extraction model class for the at least one domain of interest;

extract instances of the entities mentions, instances of the properties mentions and instances of the relation mentions between the associated entities mentions and between the properties mentions associated with the entities mentions from the preprocessed raw text using the obtained instance of the extraction model class and associating the instances of the entities mentions, instances of the properties mentions and instances of the relation mentions with corresponding instances of the meta model class;

store the extracted instances of the entities mentions, instances of the properties mentions and instances of the relation mentions in the mention model in an object graph form;

index the object graph to a graph knowledge base along with the preprocessed raw text associated with each of the plurality of documents;

generate a query language parser corresponding to the at least one domain of interest;

translate, using the generated query language parser, a received search query to an equivalent query over the indexed graph knowledge base, wherein the search query is either (i) an object query over the mentions, (ii) a keyword based text query or (iii) a combination of the object query over the mentions and the keyword based text query, wherein the equivalent query pertains to the at least one domain of interest; and identify one or more matches related to the translated query in the graph knowledge base.

* * * * *